United States Patent [19]

Kida et al.

[11] Patent Number: 5,536,756
[45] Date of Patent: Jul. 16, 1996

[54] THERMOEXPANDABLE MICROCAPSULE AND PRODUCTION

[75] Inventors: Sueo Kida, Kashihara; Kenichi Kitano, Osaka; Kyuno Seiji, Itami, all of Japan

[73] Assignee: Matsumoto Yushi-Seiyaku Co., Ltd., Yao, Japan

[21] Appl. No.: 311,714

[22] Filed: Sep. 23, 1994

Related U.S. Application Data

[63] Continuation of Ser. No. 46,966, Apr. 15, 1993, abandoned.

[30] Foreign Application Priority Data

Apr. 15, 1992 [JP] Japan .................................. 4-095174

[51] Int. Cl.$^6$ ............................... B01J 13/18; C08J 9/14
[52] U.S. Cl. ........................... 521/56; 264/4.33; 264/4.7; 428/402.22; 521/60
[58] Field of Search .................... 264/4.33, 4.7; 428/402.22; 521/56, 57, 72, 76, 60; 524/923

[56] References Cited

U.S. PATENT DOCUMENTS

| | | | |
|---|---|---|---|
| 2,969,330 | 1/1961 | Brynko | 264/4.7 |
| 3,317,433 | 5/1967 | Eichel | 428/402.22 |
| 3,386,926 | 6/1968 | Gavoret | 521/56 |
| 3,615,972 | 10/1971 | Morehouse et al. | 156/79 |
| 3,878,133 | 4/1975 | Rubens | 521/59 |
| 4,016,110 | 4/1977 | Cohrs et al. | 264/4.7 X |
| 4,582,756 | 4/1986 | Niinuma et al. | 428/327 |
| 4,677,003 | 6/1987 | Redlich et al. | 264/4.7 X |
| 4,699,810 | 10/1987 | Blakeman et al. | 521/72 X |
| 4,798,691 | 1/1989 | Kasai et al. | 428/402.22 X |
| 4,940,734 | 7/1990 | Ley et al. | 521/84.1 |
| 5,047,437 | 9/1991 | Cooke et al. | 521/56 |
| 5,356,683 | 10/1994 | Egolf et al. | 521/72 X |

FOREIGN PATENT DOCUMENTS

| 4226524 | 6/1986 | Japan . |
|---|---|---|
| 62-286534 | 6/1986 | Japan . |

OTHER PUBLICATIONS

*Patent Abstracts of Japan*, vol. 012, No. 181, & JP-A-62 286 534, May 1988, Abstract.
Database WPI, Week 8128, 26 May 1981, Derwent Publications Ltd., AN 81-50838 & JP-A-56 061 467, Abstract.
European Search Report.

*Primary Examiner*—Richard D. Lovering
*Attorney, Agent, or Firm*—Foley & Lardner

[57] ABSTRACT

The present invention provides a thermoplastic microcapsule which is softened by heat, has a good thermoexpandability, and can provide a MICROBALLOON which shows a high heat resistance after thermoexpanded; such a thermoexpandable microcapsule is composed of a shell and an expanding agent therein, in which said shell is made from a copolymer essentially consisting of a polymerizable monomer having two or more polymerizable double bonds and a monomer which can produce a homopolymer having a high glass transition temperature, and said expanding agent is vaporizable at a temperature lower than the softening temperature of the copolymer.

20 Claims, No Drawings

THERMOEXPANDABLE MICROCAPSULE AND PRODUCTION

This application is a continuation of U.S. application Ser. No. 08/046,966 filed Apr. 15, 1993, now abandoned.

BACKGROUND OF THE INVENTION

The present invention relates to a thermoexpandable microcapsule excellent in the heat resistance, and process for production thereof.

A production of a thermoexpandable microcapsule has been disclosed in, for instance, Japanese Patent Publication No. 42-286534, in which an expanding agent is microencapsulated with a thermoplastic polymer, which is vaporizable at a temperature lower than the softening temperature of the thermoplastic polymer.

We have proposed a thermoexpandable microcapsule excellent in a heat resistance and solvent resistance, in which nitrile monomers are used in the amount of 80% by weight or more as a monomer having a polymerizable double bond for shell of the microcapsule.

SUMMARY OF THE INVENTION

The present invention provides a microcapsule which is easily thermoexpanded, but the obtained thermoexpanded microcapsule, that is, a MICROBALLOON has a high heat resistance. Such a thermoexpandable microcapsule comprises a shell and an expanding agent therein, in which said shell is made from a copolymer essentially consisting of a polymerizable monomer having two or more polymerizable double bonds and a monomer which can produce a homopolymer having a high glass transition temperature, and said expanding agent is vaporizable at a temperature lower than the softening temperature of the copolymer.

DETAILED DESCRIPTION OF THE INVENTION

The present invention relates to a thermoexpandable microcapsule, production thereof, and a MICROBALLOON obtained from the microcapsule.

The shell of a thermoexpandable microcapsule must be softened by heat at expansion. This means that the obtained expanded microcapsule (this expanded microcapsule is referred to as "MICROBALLOON" hereinafter) is also softened by heat, that is, the MICROBALLOON obtained is liable to shrink or deform by heat.

The object of the present invention is to provide a thermoplastic microcapsule which is softened by heat, and not only has high expandability but also gives a MICROBALLOON having a high heat resistance after expanded, and production of the microcapsule.

The present invention provides a thermoexpandable microcapsule which comprises a shell and an expanding agent therein, in which said shell is made from a copolymer essentially consisting of a polymerizable monomer (A) having two or more polymerizable double bonds and a monomer (B) which can produce a homopolymer having a high glass transition temperature, and said expanding agent is vaporizable at a temperature lower than the softening temperature of the copolymer, and the production thereof.

As the polymerizable monomer (A) having two or more polymerizable double bonds a polyfunctional vinyl monomer and/or an inner olefin-containing monomer. As the polyfunctional vinyl monomer there are exemplified divinylbenzene, ethylene glycol di(meth)acrylate (the term "(meth)acryl" means both of "methacryl" and "acryl" in the present specification), trimethylolpropane tri(meth)acrylate, glycerol di(meth)acrylate, pentaerythritol tri(meth)acrylate, tri(meth)acrylformal, and the like. The most preferable polyfunctional vinyl monomers are ethylene glycol di(meth)acrylate, trimethylolpropane tri(meth)acrylate, triacrylformal.

As the inner olefin-containing monomer vinyl cinnamate, vinyl crotonate, vinyl maleate, vinyl fumarate, dicyclopentenyl acrylate and the like are exemplified. The most preferable ones are vinyl crotonate, vinyl maleate, and dicyclopentenyl acrylate.

The polymerizable monomer (A) having two or more polymerizable double bonds according to the present invention may be used, preferably, in the amount of 0.01–3 by weight, more preferably 0.05–2% by weight. If the amount of the polymerizable monomer (A) is less than 0.01% by weight, a copolymer less in the degree of crosslinking is obtained, which is insufficient in the heat resistance. In the meanwhile, when the amount of the monomer (A) is more than 3% by weight, a polymer having so much the degree of crosslinking is obtained that the expandability becomes worse. Both are not preferable.

A preferable monomer (B) which can produce a homopolymer having a high glass transition temperature is one giving a homopolymer having a glass transition temperature of 80° C. or higher, and more preferably 100° C. to 200° C. Preferable examples of such monomer (B) include methacrylonitrile, acrylamide, methacrylic acid or salts thereof, isobornyl methacrylate, dicyclopentenyl acrylate and the like. Especially preferable monomers (B) are methacrylonitrile, acrylamide, methacrylic acid or salts thereof, isobornyl methacrylate, dicyclopentenyl acrylate.

A monomer (B) which can produce a homopolymer having a high glass transition temperature may be used in the amount of 10 to 80% by weight, more preferably 20 to 50% by weight to prepare the microcapsule. If the monomer (B) exceeds 80% by weight, the shell formation, especially evenness of the shell becomes worse to less expandability. If the amount is less than 10% by weight the heat resistance of the balloon obtained cannot be improved.

According so the present invention another monomer(s)(c) such as vinyl chloride, vinylidene chloride, acrylonitrile, vinyl acetate, styrene, methyl methacrylate and the like may be used in the amount of 90% by weight or less, preferably 50% by weight or less.

The expanding agent vaporizable at a temperature lower than the softening temperature of copolymer of the shell is an expanding agent encapsulated into the microcapsule of the present invention. As the softening temperature of the copolymer is usually about 100° to 150° C. the expanding agent of the present invention is one vaporizable at lower temperature than the above. Examples of the expanding agent include propane, propylene, butene, n-butane, isobutane, isopentane, neopentane, n-pentane, hexane, heptane, petroleum ether, halogenized methane (methyl chloride, methylene chloride, $CCl_3F$, $CCl_2F_2$ etc.), tetraalkylsilane (tetramethylsilane, trimethylsilane etc.) and the like.

A copolymer forming the shell of the present invention may be prepared preferably using a radical initiator having a long half-life. As the radical initiator having a long half-life is preferable one having a half-life of about 10 hours or longer (at 50° C.), for example, azobisisobutyronitrile, dicumyl peroxide, lauroyl peroxide benzoyl peroxide, methyl ethyl ketone peroxide, azobis-2-methylbutyronitrile, dimethyl azobisisobutylate and the like.

The crosslinking reaction is progressed by the radical initiator having a long half-life when the microcapsule is heated to expand, and the heat resistance of the MICROBALLOON is extremely improved. The amount of the initiator to be used is preferably about 0.1 to 5% by weight, more preferably about 0.2 to 3% by weight. When the amount of the initiator exceeds 5% by weight, extreme polymerization will occur, which is very dangerous. When the amount of the initiator is less than 0.1% by weight, a low rate of polymerization is only achieved, so that sufficient expandability and heat resistance cannot be obtained.

The method of production of the microcapsule using the above ingredients is not limitative, and may be performed according to a conventional manner, as preferable example, Japanese Patent Publication No. 42-26524, such that a polymerizable monomer is mixed with a vaporizable expanding agent and an intitiator, and the obtained mixture is suspension-polymerized in an aqueous medium which may contain an emulsifier, dispersing agent and the like, if desired.

The formulation of the aqueous medium for the suspension polymerization is not limitative, but in general it may contain inorganic additives such as silica, calcium phosphate, calcium carbonate, sodium chloride, sodium sulfate, and the like; organic additives such as diethanolamine-adipic acid condensation products, gelatin, methyl cellulose, polyvinyl alcohol, polyethylene oxide, dioctyl sulfosuccinate, sorbitan esters etc. and the like. These additives may be dissolved in deionized water and the pH value may be preferably adjusted to about 3–4 using an acid.

The particle size of the thermoexpandable microcapsule is preferably 10 to 30 μm, especially about 15 to 25 μm, which can produce MICROBALLOONS having a particle size of about 50 to 150 μm when expanded at about 130° to 200° C. These MICROBALLOONS obtained are resistible against the temperature of 150° to 200° C.

The present invention is explained by following examples.

COMPARATIVE EXAMPLE 1

An oily mixture and an aqueous medium are prepared according to the following formulation;

| ingredients | parts by weight |
|---|---|
| Oily Mixture | |
| vinylidene chloride | 200 |
| acrylonitrile | 110 |
| methyl methacrylate | 10 |
| n-pentane | 60 |
| diisopropyl peroxy dicarbonate | 1.5 |
| Aqueous Medium | |
| deionized water | 600 |
| dispersion of colloidal silica (solid 20%) | 90 |
| diethanolamine-adipic acid condensation product (50% aqueous solution) | 3.5 |

The above oily mixture and the aqueous medium were charged into a 1.5 liter autoclave, dispersed by means of a homomixer (M-Type available from Tokushu Kakoki K.K.) at 6000 rpm for 120 seconds, and polymerized under a nitrogen atmosphere, 3–4 kg/cm², and 60° C. for 20 hours to give a microcapsule of an average diameter of 17.8 μm. The obtained microcapsule was heated at 140° C. for 2 minutes under heated air to give a MICROBALLOON having a true specific gravity of 0.03 and an average diameter of 70–80 μm. The MICROBALLOON obtained was heated at 150° C. for 20 minutes under atmospheric pressure to determine the change of the true gravity, by which the heat resistance was evaluated. The results were shown in Table 1.

EXAMPLE 1

According to following formulation an oily mixture was prepared.

| Formulation | |
|---|---|
| ingredients | parts by weight |
| acrylonitrile | 180 |
| methacrylonitrile | 90 |
| methyl methacrylate | 15 |
| trimethylol propane trimethacrylate | 1.5 |
| n-pentane | 60 |
| azobisisobutyronitrile | 1.5 |

The above oily mixture and the aqueous medium used in the Comparative Example 1 were mixed and microencapsulated according to the Comparative Example 1 to give a microcapsule of an average diameter of 16.9 μm. The microcapsule obtained was heated in heated air of 160° C. for 2 minutes to give a MICROBALLOON having a true gravity of 0.026 and an average diameter of 80 to 90 μm. The change of the true gravity of this MICROBALLOON was observed by heating it under atmospheric pressure, at 150° C. and at 180° C. for 20 minutes to know the heat resistance of the micro balloon. The results were shown in Table 1.

EXAMPLE 2

An oily mixture was prepared according to the following formulation.

| Formulation | |
|---|---|
| ingredients | parts by weight |
| acrylonitrile | 200 |
| methacrylonitrile | 80 |
| isobornyl methacrylate | 15 |
| trimethylol propane trimethacrylate | 1.5 |
| n-pentane | 60 |
| azobisisobutyronitrile | 1.5 |

The above oily mixture and the aqueous medium of the Comparative Example 1 were mixed, and microencapsulated according to the Comparative Example 1 to give a microcapsule of an average diameter of 18.5 μm. This microcapsule was heated in heated air of 160° C. for 2 minutes to give a MICROBALLOON having a true gravity of 0.033 and an average diameter of 90 to 100 μm. In order to know the heat resistance of the obtained MICROBALLOON the change of the true gravity was observed by nearing it under atmospheric pressure at 160° C. and 180° C. for 20 minutes, and the results were shown in Table 1.

EXAMPLE 3

An oily mixture was prepared according to the following formulation.

| Formulation | |
|---|---|
| ingredients | parts by weight |
| acrylonitrile | 200 |
| methacrylonitrile | 80 |
| isobornyl methacrylate | 15 |
| trimethylol propane trimethacrylate | 1.5 |
| dicyclopentenyl acrylate | 0.7 |
| n-pentane | 60 |
| azobisisobutyronitrile | 1.5 |

The above oily mixture and the aqueous medium of the Comparative Example 1 were mixed, and microencapsulated according to the Comparative Example 1 to give a microcapsule of an average diameter of 17.2 μm. This microcapsule was heated in heated air of 160° C. for 2 minutes to give a microballoon having a true gravity of 0.022 and an average diameter of 90 to 100 μm. In order to determine the heat resistance of the obtained micro balloon the change of true gravity was determined by heating it under atmospheric pressure at 160° C. and 180° C. for 20 minutes, and the results were shown in Table 1.

EXAMPLE 4

An oily mixture was prepared according to the following formulation.

| Formulation | |
|---|---|
| ingredients | parts by weight |
| acrylonitrile | 200 |
| methacrylonitrile | 80 |
| isobornyl methacrylate | 15 |
| trimethylol propane trimethacrylate | 1.5 |
| dicyclopentenyl acrylate | 0.7 |
| n-pentane | 60 |
| azobisisobutyronitrile | 1.0 |
| lauroyl peroxide | 1.0 |

The above oily mixture and the aqueous medium of the Comparative Example 1 were mixed, and microencapsulated according to the Comparative Example 1 to give a microcapsule of an average diameter of 17.8 μm. This microcapsule was heated in heated air of 160° C. for 2 minutes to give a microballoon having a true gravity of 0.026 and an average diameter of 80 to 90 μm. In order to determine the heat resistance of the obtained MICROBALLOON the change of the true gravity was determined by heating it under atmospheric pressure at 160° C. and 180° C. for 20 minutes, and the results were shown in Table 1.

TABLE 1

| Example | average diameter of microcapsule μm | MICROBALLOON particle size μm | MICROBALLOON true gravity | true gravity after heated for 20 min. 150° C. | true gravity after heated for 20 min. 160° C. | true gravity after heated for 20 min. 180° C. |
|---|---|---|---|---|---|---|
| Comp. 1 | 17.8 | 70–80 | 0.03 | 0.95 | — | — |
| Ex. 1 | 16.9 | 80–90 | 0.026 | 0.063 | — | 0.093 |
| Ex. 2 | 18.5 | 90–100 | 0.033 | — | 5.058 | 0.076 |
| Ex. 3 | 17.2 | 90–100 | 0.022 | — | 0.052 | 0.065 |
| Ex. 4 | 17.8 | 80–90 | 0.026 | — | 0.047 | 0.055 |

What is claimed is:

1. A thermoexpandable microcapsule which comprises a shell and an expanding agent therein, in which the shell is made from a copolymer of monomers comprising (A) a polymerizable monomer having two or more polymerizable double bonds, (B) (a) a monomer selected from the group consisting of acryl amide and isobornyl methacrylate, and (b) optionally a monomer which can produce a homopolymer having a glass transition temperature of 100° C. to 200° C. excepting the used (a), and (C) a polymerizable monomer having an ethylenically unsaturated bond excepting the used (A) or the used (B), wherein said expanding agent is vaporizable at a temperature lower than the softening temperature of the copolymer.

2. A thermoexpandable microcapsule of claim 1, in which the polymerizable monomer (A) is selected from the group consisting of divinylbenzene, ethylene glycol di(meth)acrylate, trimethylolpropane tri(meth)acrylate, glycerol di(meth)acrylate, pentaerythritol tri(meth)acrylate, tri(meth)acryl formal, vinyl cinnamate, vinyl crotonate, vinyl maleate, vinyl fumarate, and dicyclopentenyl acrylate.

3. A thermoexpandable microcapsule of claim 1, in which the monomer (B) (a) is isobornyl methacrylate.

4. A thermoexpanded microcapsule prepared by expanding the thermoexpandable microcapsule of claim 3.

5. A thermoexpandable microcapsule of claim 1, in which the monomer (C) is selected from the group consisting of vinyl chloride, vinylidene chloride, acrylonitrile, vinyl acetate, styrene, and methyl methacrylate.

6. A thermoexpandable microcapsule of claim 1, in which the monomers (A), (B) and (C) are contained in the amount of 0.01 to 3.0% by weight, 10 to 80% by weight, and 90% by weight or less respectively based on the total weight of the monomers constituting the copolymer.

7. A thermoexpandable microcapsule of claim 1, 20 to 50% by weight and 50% by weight or less respectively based on the total weight of the monomers constituting the copolymer.

8. A thermoexpandable microcapsule of claim 1, the particle size of which is 10 to 30 μm, and which is able to give microballoons having a particle size of about 50 to 150 μm when heated at about 130° to 200° C.

9. A thermoexpandable microcapsule of claim 1, in which the monomer (B) (a) is acryl amide.

10. A thermoexpandable microcapsule of claim 1, wherein (B) (b) is present and comprises methacrylonitrile.

11. A thermoexpandable microcapsule of claim 1, wherein (C) comprises acrylonitrile.

12. A thermoexpandable microcapsule of claim 1, wherein (A) is trimethylol propane trimethacrylate or dicyclopentenyl acrylate.

13. A thermoexpandable microcapsule of claim 1, wherein a monomer (B) (b) is present.

14. A thermoexpandable microcapsule of claim 13, wherein (B) (b) is selected from the group consisting of methacrylonitrile, methacrylic acid or salts thereof, and dicyclopentenyl acrylate.

15. A thermoexpandable microcapsule of claim 1, wherein the expanding agent is selected from the group consisting of propane, propylene, butene, n-butane, isobutane, isopentane, neopentane, n-pentane, hexane, heptane, petroleum ether, halogenized methanes, and tetraalkylsilanes.

16. A thermoexpandable microcapsule of claim 1, wherein (A) comprises trimethylol propane trimethacrylate, (B) (a) comprises isobornyl methacrylate, (B) (b) is present and comprises methacrylonitrile, and (C) comprises acrylonitrile.

17. A thermoexpanded microcapsule prepared by expanding the thermoexpandable microcapsule of claim 1.

18. A thermoexpanded microcapsule having a particle size of about 50 to 150 μm prepared by expanding the thermoexpandable microcapsule of claim 1.

19. A process for the production of a thermoexpandable microcapsule of claim 1, comprising dispersion or suspension polymerizing monomers (A), (B), and (C) in the presence of the expanding agent.

20. A process as claimed in claim 19, wherein the dispersion or suspension polymerization is conducted in the presence of a radical initiator having a half-life of about 10 hours or longer at 50° C.

* * * * *

UNITED STATES PATENT AND TRADEMARK OFFICE
CERTIFICATE OF CORRECTION

PATENT NO. : 5,536,756
DATED : July 16, 1996
INVENTOR(S) : Sueo KIDA et al.

It is certified that error appears in the above-indentified patent and that said Letters Patent is hereby corrected as shown below:

On the title page, item [75] "Kyuno Seiji" should read --Seiji KYUNO--.

Signed and Sealed this

Third Day of June, 1997

*Attest:*

BRUCE LEHMAN

*Attesting Officer*     *Commissioner of Patents and Trademarks*